Sept. 20, 1932.　　　A. W. WESSMAN　　　1,878,922
GRAIN MEASURING DEVICE
Filed Dec. 5, 1928　　2 Sheets-Sheet 1

Inventor
Arnt W. Wessman
By [signature]
Atty.

Sept. 20, 1932. A. W. WESSMAN 1,878,922

GRAIN MEASURING DEVICE

Filed Dec. 5, 1928 2 Sheets-Sheet 2

Inventor
Arnt W. Wessman
By H. P. Doolittle
Atty.

Patented Sept. 20, 1932

1,878,922

UNITED STATES PATENT OFFICE

ARNT W. WESSMAN, OF CHICAGO, ILLINOIS, ASSIGNOR TO INTERNATIONAL HARVESTER COMPANY, A CORPORATION OF NEW JERSEY

GRAIN MEASURING DEVICE

Application filed December 5, 1928. Serial No. 323,919.

The invention is in a grain measuring device.

In the use of threshers and also in harvester threshers, it has been found desirable to measure the grain output of these machines in bushels. Accordingly, it is common practice to provide a grain measuring device at the discharge spout of these machines, which device receives the grain and measures the same in bushel quantities.

It is the primary object of this invention to provide such a grain measuring device which includes an improved control means automatically to regulate its operation.

Other and incidental objects will become apparent to those skilled in this art as the disclosure of the invention is made.

Briefly, these desirable objects are achieved in the provision of a casing including a compartmented, rotatable hopper, which operates adjacent a chamber that is provided with a charging mechanism. When those compartments of the rotatable hopper which are exposed to the charging chamber have been loaded with grain, a force is exerted to move a member that in turn actuates a trip which frees the driving mechanism to cause the hopper to move to discharge one compartment by gravity into any suitable form of receiver while a new or empty compartment is brought into position to be loaded or charged. At this time the drive again becomes locked to stop rotation of the compartmented hopper, and the operation of charging and unloading thus proceeds in a step by step manner, all as will later more fully appear.

Each compartment of the rotatable hopper, it is understood, will have a capacity that bears a certain predetermined ratio to the capacity of a bushel, and so it is to be understood that, when a predetermined number of compartment discharges have been effected, a bushel of grain has been measured out. A tally device may be used to record the number of bushels.

In the accompanying sheets of drawings illustrating a practicable form of the measuring device,—

Figure 4 is a sectional view through the control clutch, as seen along the line 4—4 looking in the direction of the arrows appearing in Figure 1; and, Figure 5 is a fragmentary view of substantially the same section appearing in Figure 4.

Figure 1:
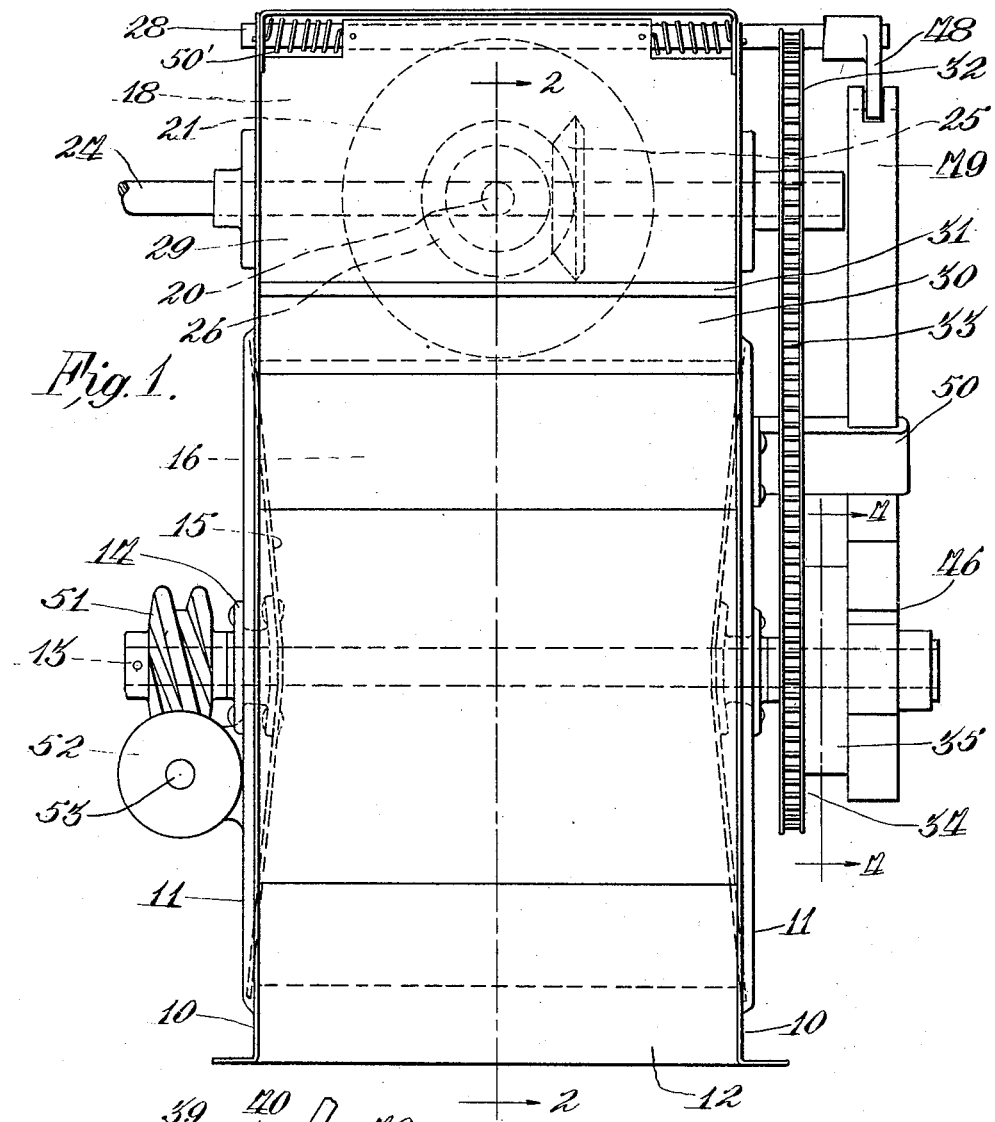
Figure 1 is a side elevational view of the measuring device.
Figure 2:
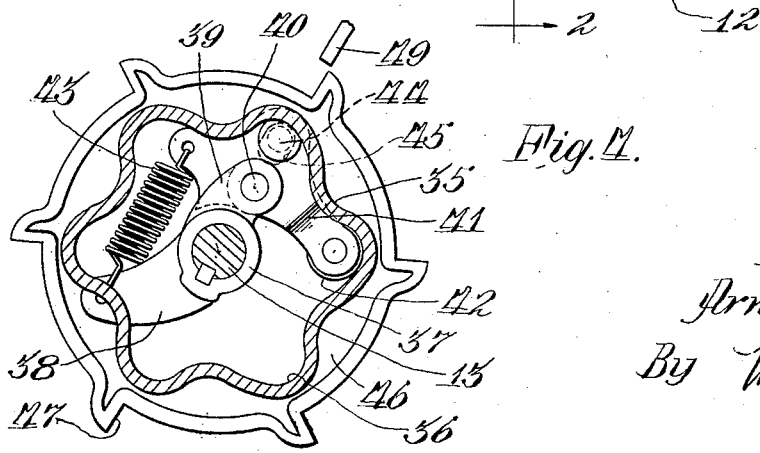
Figure 2 is a cross sectional view on a somewhat reduced scale, as seen along the line 2—2 of Figure 1 when looking in the direction of the arrows.
Figure 2:
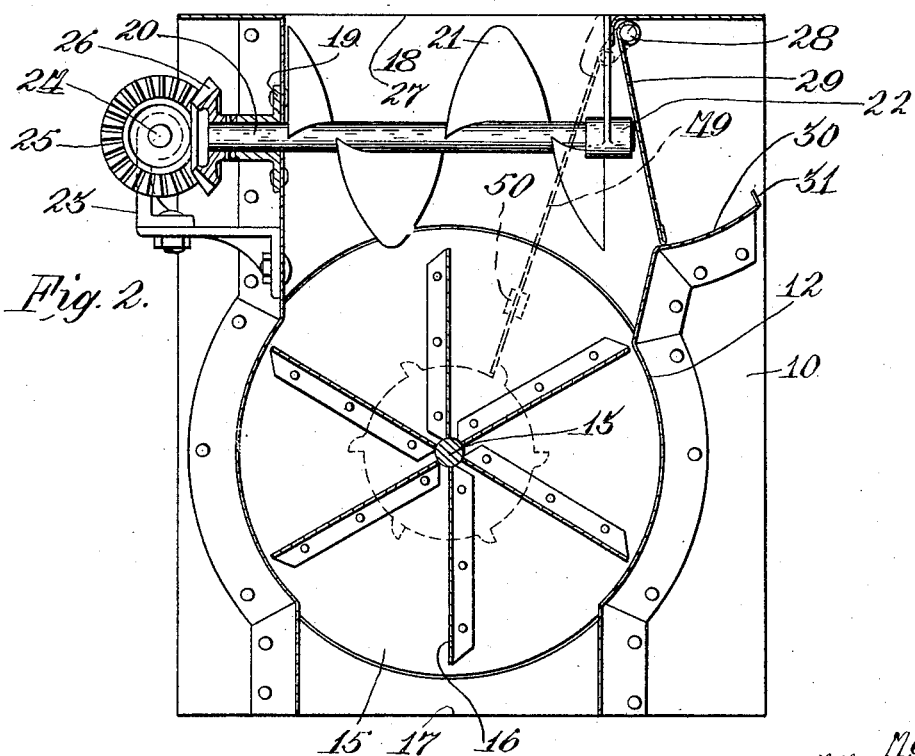

As best shown in Figures 1 and 2, the measuring device of this invention embodies a casing having end walls 10 which are provided with circular, slightly pressed out, portions 11. In any appropriate manner, the end walls 10 are connected to side walls 12, which walls in their middles are rounded, as shown in Figure 2.

A shaft 13 is journaled in the bulged portion 11 of the end walls by means of bearings 14 carried by said end walls. The bearings include means for carrying inwardly bulged end walls 15 of a drum made fast to the shaft 13 to turn therewith, said drum being cylindrical and divided by radial partitions 16 into six segmentally shaped pockets or compartments. Beneath this compartmented, cylindrical drum the side walls 12 of the casing extend straight down to form a discharge opening 17, as the bottom of the casing is open at this point.

Above the cylindrical compartmented drum is a transverse chamber 18 which constitutes the charging chamber for loading the grain into the pockets or compartments of the drum. One of the side walls 12 of the casing extends upwardly a distance and carries a bearing bracket 19 in which is rotatably journaled a cross shaft 20, which shaft within the chamber 18 has mounted thereon an auger feeding device 21 which constitutes a packing element. The opposite end of the shaft 20 is carried in any convenient bearing bracket 22, as shown in Figure 2.

A bracket 23 on a side wall 12 carries a shaft 24 that drives a bevel gear 25 in mesh with a bevel pinion 26 keyed to the shaft 20. The shaft 24 will be driven from any suitable moving part of the threshing machine, as will be understood, and thus rotation will be imparted to the auger 21. The top of the charging chamber 18 is open, as at 27, to form a charging opening for feeding the grain to be measured into the chamber 18.

The end walls 10 adjacent their upper ends are employed to journal for rocking movement therein a shaft 28 to which is suitably made fast to rock therewith in any approved manner, a flap or end wall member 29, the lower end of which is adapted to travel, when the shaft 28 is rocked, across a curved portion 30 of a side wall 12, as best shown in Figure 2. A stop 31 is formed at the end of this portion 30 to limit the outward movement of the flap 29.

Figure 3:
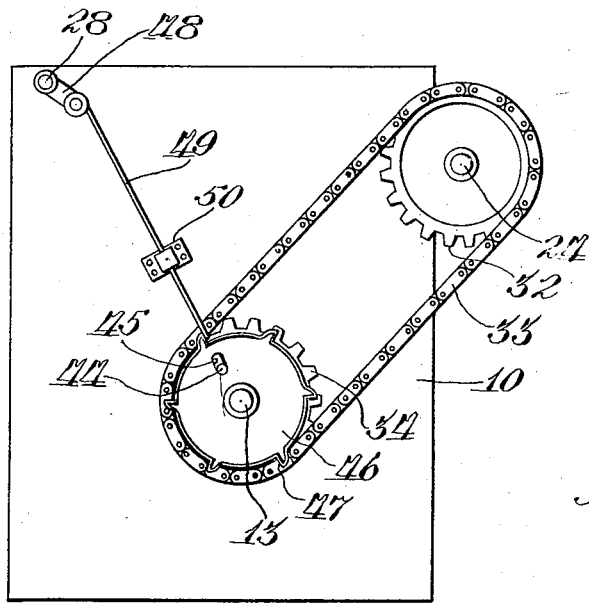
Figure 3 is an end elevational view showing the driving and control mechanism which appears on the right end wall shown in Figure 1.

As shown in Figures 1 and 3, an end of the shaft 24 carries a sprocket wheel 32 around which is trained a chain 33 that is also trained over a constantly rotating sprocket wheel 34 loosely mounted on the shaft 13. The constantly rotating sprocket wheel 34 has formed therewith a lateral, integral hub extension 35 which assumes the form of a circular sinusoid, leaving pockets 36, as best shown in Figure 4. Adjacent these parts the shaft 13 has keyed thereto a collar 37 which has formed therewith an arm extension 38 extending in one direction, and another arm 39 extending in an opposite direction and which is provided at its end with a pin 40, upon which is pivotally mounted a dog 41 having mounted at its outer end a roller 42. A spring 43 is connected between the dog 41 and the arm 38, said spring acting normally to press the roller 42 in one of the pockets 36.

The dog 41 has a portion set back behind the element 35, as shown in Figure 4, that carries a pin 44 which extends laterally and is passed into an elongated, radial opening 45 in a wheel 46, which along its outer periphery, at spaced intervals thereon, is formed with six stops 47, there being one stop for each of the six compartments formed within the rotatable measuring drum heretofore described.

At one end, the shaft 28 carries a crank 48 to which is pivotally connected a trip arm 49 that is guided in a guide member 50 made fast to the end wall 10, as shown in Figures 1 and 3. The lower end of the trip 49 is adapted to be engaged, when in proper position, by any one of the stop elements 47 to cause the wheel element 46 to be held idle. When the wheel element 46 is idle, the dog 41 through the pin 44 is moved in such a direction that its roller 42 is unseated from one of the pockets 36 in the member 35, thus holding the shaft 13 idle to hold the rotatable drum idle. The trip 49 is controlled by the flap 29, as will now appear from the description of the operation of the machine.

In use, the grain measuring device of this invention is located in position to receive grain discharged by the thresher discharge spout, the grain falling by gravity into the chamber 18. The grain then falls into the two segmental compartments which are always exposed to the chamber 18 and these two compartments then gradually fill. The auger 21 is constantly rotating to level and pack the grain in these two compartments of the rotatable drum.

Figure 5:
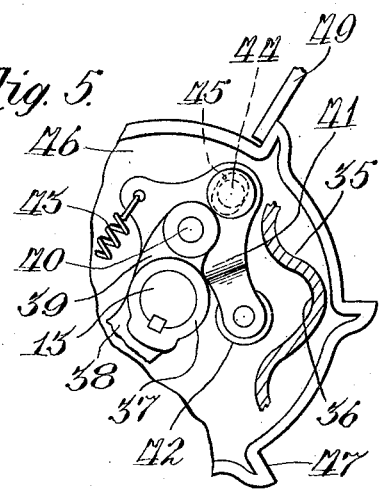

When the two compartments have been filled, the chamber 18 fills, and, as the auger continues to feed, a pressure is created through the grain which causes the flap member 29 to be moved to the right, as shown in Figure 2. This flap member 29 then, as it moves outwardly, rocks the shaft 28, which causes the trip 49 to be removed from engagement with one of the stops 47, as shown in Figure 4, which, due to the structure described, causes the constantly rotating clutch element or sprocket wheel 34 and its drum 35 to drive the intermittent clutch element 46, which, through the dog 41, then rotates the shaft 13 upon which the rotatable compartmented grain measuring drum is mounted. The drum turns one-sixth of a revolution which brings into register with the chamber 18 an empty compartment, thus relieving the pressure on the flap member 29, so that springs 50' are caused to rock the shaft 28 back to its normal position with the member 29, as shown in Figure 2. This movement of the shaft 28 through the crank 48 lowers the trip 49 into position, as shown in Figure 5, to catch the next stop 47 to prevent rotation through the clutch structure of the shaft 13, which means that for the moment, while the new empty compartment is being filled, the drum is held stationary with the shaft 13. Accordingly, the starting and stopping of the drum is automatically regulated by the feeding of the grain itself, and so the drum is charged at its top end through the inlet opening 27 into the chamber 18 and carried around by the drum through the medium of its segmental pockets until the pockets are presented to the discharge opening 17, whereupon the grain therein is discharged by gravity into any appropriate form of receiving device.

The compartments of the rotatable drum will be of such a size that they bear a predetermined ratio to a bushel capacity; for example, one compartment may equal one-twenty-fourth of a bushel, which means that, when 24 compartments of grain have been discharged through the outlet 17, one bushel of grain has been measured by the device of this invention. By means of a worm gear 51 on the opposite end of the shaft 13 and through a pinion 52 on a supplementary shaft 53, any form of tally device may be automatically operated to count the bushels of grain measured by the device of this invention.

It is interesting to note that the inwardly bulged sides 15 of the rotatable drum have their outer peripheral ends turning in the bulged out portion 11 in each end wall, so that a flush side wall structure is presented which will not hamper the discharge of grain from the rotatable drum compartments out of the discharge opening 17.

From this detailed disclosure, it should now be apparent that all of the desirable objects of the invention have been accomplished. It is to be understood that it is the intention to cover all such changes and modifications of the form of the grain measuring device disclosed as do not materially depart from the spirit and scope of the invention as is indicated in the appended claims.

What is claimed is:

1. In a grain measuring device having a casing forming a measuring chamber with a discharge opening at its bottom, said casing at one end being extended outwardly to form a track, a charging chamber directly above the measuring chamber, an intermittently rotating compartmented measuring drum located in the measuring chamber, an auger directly above the drum in the charging chamber, means for turning the auger, a rockshaft across the top of the charging chamber at one end thereof and above said track, a flap connected to rock with said shaft and having its lower end closely engaging said track, means embodying a clutch for driving the drum, and means actuated by the rockshaft to control said clutch.

2. In a grain measuring device having a casing, a charging chamber having a charging opening, a measuring chamber having a discharge opening, an intermittently rotatable measuring device in said measuring chamber, said measuring device being provided with a plurality of material receiving compartments, movable means in the feeding chamber for packing and directing material into compartments of the measuring device, connections for driving said movable means, a rockshaft carried transversely of the casing adjacent an end of the charging chamber, a flap member pivotally mounted on said rockshaft and closing said end of the charging chamber and movable back under pressure of the material moved by the movable means to rock the shaft, means for turning the measuring device, said means including a clutch having an intermittently rotating part, a trip normally holding said intermittent clutch part against rotation, means connecting said trip and rockshaft whereby said trip may be moved by the rockshaft to free the intermittent clutch part, thereby permitting the clutch to rotate to operate the means for turning the measuring device.

3. In a grain measuring device having a casing, a charging chamber having a charging opening, a measuring chamber having a discharge opening, an intermittently rotatable measuring device in said measuring chamber, said measuring device being provided with a plurality of material receiving compartments, an auger in the feeding chamber for directing material into compartments of the measuring device, means for driving the auger, a rockshaft carried transversely of the casing adjacent an end of the charging chamber, a flap member pivotally mounted on said rockshaft and closing said end of the charging chamber and movable back under pressure of the material fed by the auger to rock the shaft, means embodying a clutch for turning the measuring device, said clutch including an intermittently rotatable member, and a slidably mounted trip connected to the rockshaft and engaging the intermittent member normally to lock the same against rotation, said rockshaft being actuated by the flap member under pressure of the material to free the slidable trip from the intermittent clutch member thereby permitting the clutch to rotate to operate the means for turning the measuring device.

4. In a grain measuring device having a casing, a charging chamber having a charging opening, a measuring chamber having a discharge opening, an intermittently rotatable measuring device in said measuring chamber, said measuring device being provided with a plurality of material receiving compartments, an auger in the feeding chamber for directing material into compartments of the measuring device, means to rotate said auger, a rockshaft carried transversely of the casing adjacent an end of the charging chamber, a flap member pivotally mounted on said rockshaft and closing the said end of the charging chamber and movable back under pressure of the material to rock the shaft, means embodying a clutch for turning the measuring device, said clutch including an intermittently rotatable member, a trip connected to the rockshaft and engaging the intermittent member normally to lock the same against rotation, said rockshaft being actuated by the flap member under pressure of the material to free the slidable trip from the intermittent clutch member, thereby permitting the clutch to rotate to cause rotation of the measuring device, and means acting when the pressure of the material is relieved to cause the flap, shaft and trip to return to their normal positions, whereby the intermittent clutch member and measuring device are again held against rotation.

In testimony whereof I affix my signature.

ARNT W. WESSMAN.